(12) United States Patent
Huynh Huu et al.

(10) Patent No.: US 8,825,601 B2
(45) Date of Patent: Sep. 2, 2014

(54) LOGICAL DATA BACKUP AND ROLLBACK USING INCREMENTAL CAPTURE IN A DISTRIBUTED DATABASE

(75) Inventors: Hanh Huynh Huu, Redmond, WA (US); Zhongwei Wu, Sammamish, WA (US); Oliver N. Seeliger, Sammamish, WA (US); Shankar Pal, Redmond, WA (US); Christian Rober, Seattle, WA (US); Bruno H. M. Denuit, Redmond, WA (US); Lev Novik, Bellevue, WA (US); Nigel R. Ellis, Redmond, WA (US); Tomas Talius, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 227 days.

(21) Appl. No.: 12/697,302

(22) Filed: Feb. 1, 2010

(65) Prior Publication Data

US 2011/0191299 A1    Aug. 4, 2011

(51) Int. Cl.
*G06F 7/00* (2006.01)
*G06F 17/00* (2006.01)
*G06F 17/30* (2006.01)

(52) U.S. Cl.
CPC ..................................... *G06F 17/30* (2013.01)
USPC ........................................... 707/646; 707/769

(58) Field of Classification Search
USPC ........................................ 707/679, 697, 646
See application file for complete search history.

(56) References Cited

U.S. PATENT DOCUMENTS

| | | | |
|---|---|---|---|
| 4,714,995 A | 12/1987 | Materna | |
| 5,140,685 A | 8/1992 | Sipple | |
| 5,335,343 A | 8/1994 | Lampson | |
| 5,440,735 A | 8/1995 | Goldring | |
| 5,452,445 A | 9/1995 | Hallmark | |
| 5,553,279 A | 9/1996 | Goldring | |
| 5,577,240 A | 11/1996 | Demers | |
| 5,581,754 A | 12/1996 | Terry | |
| 5,603,024 A | 2/1997 | Goldring | |
| 5,603,026 A | 2/1997 | Demers | |
| 5,613,113 A | 3/1997 | Goldring | |
| 5,671,407 A | 9/1997 | Demers | |

(Continued)

OTHER PUBLICATIONS

"15 Backup and Recovery", Oracle Database Concepts, 10g Release 1 (10.1), Part No. B10743-01, retrieved at <<http://download.oracle.com/docs/cd/B12037_01/server.101/b10743/backrec.htm>>, 2003.

(Continued)

*Primary Examiner* — Cam Truong
(74) *Attorney, Agent, or Firm* — Nicholas Chen; Kate Drakos; Micky Minhas

(57) ABSTRACT

Architecture that eliminates the need for on-disk full backups of data retaining only changes that have occurred, in a separate table. Thus, the architecture provides for incremental recovery of incremental changes in a relational database (e.g., SQL). The architecture provides improved recovery time and recovery point objectives. By using the incremental capture of changed data (e.g., in an XML format), the capability is provided to capture schema changes, query the incremental change data and efficiently restore user data to an earlier point-in-time state. Changes (e.g., insert, update and delete operations) are tracked (e.g., continuously) by a set of triggers and the incrementally captured changed rows are inserted in a data capture table (a differential change "delta" table) in a human-readable format (e.g., XML). Rollback is also provided.

15 Claims, 9 Drawing Sheets

(56) References Cited

U.S. PATENT DOCUMENTS

| | | | |
|---|---|---|---|
| 5,701,480 A | 12/1997 | Raz | |
| 5,778,350 A | 7/1998 | Adams | |
| 5,796,999 A | 8/1998 | Azagury | |
| 5,799,321 A | 8/1998 | Benson | |
| 5,819,272 A | 10/1998 | Benson | |
| 5,940,826 A | 8/1999 | Heideman | |
| 6,279,032 B1 | 8/2001 | Short | |
| 6,397,352 B1 | 5/2002 | Chandrasekaran | |
| 6,401,120 B1 | 6/2002 | Gamache | |
| 6,401,136 B1 | 6/2002 | Britton | |
| 6,438,558 B1 | 8/2002 | Stegelmann | |
| 6,463,532 B1 | 10/2002 | Reuter | |
| 6,477,629 B1 | 11/2002 | Goshey et al. | |
| 6,615,256 B1 | 9/2003 | van Ingen | |
| 6,671,821 B1 | 12/2003 | Castro | |
| 6,701,345 B1 | 3/2004 | Carley | |
| 6,769,074 B2 | 7/2004 | Vaitzblit | |
| 6,845,384 B2 | 1/2005 | Bamford | |
| 6,874,071 B2 | 3/2005 | Olstad | |
| 6,938,084 B2 | 8/2005 | Gamache | |
| 6,959,323 B1 | 10/2005 | Tzeng | |
| 6,970,876 B2 | 11/2005 | Hotti | |
| 6,978,396 B2 | 12/2005 | Ruuth | |
| 6,985,956 B2 | 1/2006 | Luke | |
| 7,107,419 B1* | 9/2006 | Ghemawat et al. | 711/162 |
| 7,206,805 B1 | 4/2007 | McLaughlin | |
| 7,222,141 B2* | 5/2007 | Zondervan et al. | 1/1 |
| 7,249,280 B2 | 7/2007 | Lamport | |
| 7,251,669 B1* | 7/2007 | Arora | 707/695 |
| 7,290,056 B1 | 10/2007 | McLaughlin | |
| 7,334,154 B2 | 2/2008 | Lorch | |
| 7,403,901 B1 | 7/2008 | Carley | |
| 7,409,460 B1 | 8/2008 | Li | |
| 7,434,096 B2 | 10/2008 | Callaway | |
| 7,478,400 B1 | 1/2009 | Banerjee | |
| 7,483,922 B1 | 1/2009 | Edlund | |
| 7,555,516 B2 | 6/2009 | Lamport | |
| 7,558,883 B1 | 7/2009 | Lamport | |
| 7,565,433 B1 | 7/2009 | Lamport | |
| 7,600,221 B1 | 10/2009 | Rangachari | |
| 7,603,354 B2 | 10/2009 | Ljungqvist | |
| 7,617,414 B2 | 11/2009 | Becker et al. | |
| 7,620,680 B1 | 11/2009 | Lamport | |
| 7,650,533 B1* | 1/2010 | Saxena et al. | 714/6.12 |
| 7,657,887 B2 | 2/2010 | Kothandaraman | |
| 7,685,171 B1* | 3/2010 | Beaverson et al. | 707/999.202 |
| 7,698,465 B2 | 4/2010 | Lamport | |
| 7,711,825 B2 | 5/2010 | Lamport | |
| 7,725,446 B2 | 5/2010 | Huras | |
| 7,774,469 B2 | 8/2010 | Massa | |
| 7,856,502 B2 | 12/2010 | Lamport | |
| 7,890,551 B2 | 2/2011 | Benelisha | |
| 7,930,274 B2 | 4/2011 | Hwang | |
| 8,005,888 B2 | 8/2011 | Lamport | |
| 8,010,550 B2 | 8/2011 | Duffy | |
| 8,024,714 B2 | 9/2011 | Duffy | |
| 8,073,897 B2 | 12/2011 | Lamport | |
| 8,086,566 B2 | 12/2011 | Edlund | |
| 2002/0161889 A1 | 10/2002 | Gamache | |
| 2002/0165724 A1 | 11/2002 | Blankesteijn | |
| 2003/0084038 A1 | 5/2003 | Balogh | |
| 2003/0093443 A1 | 5/2003 | Huxoll | |
| 2003/0105761 A1* | 6/2003 | Lagerman | 707/10 |
| 2003/0115429 A1 | 6/2003 | Olstad et al. | |
| 2003/0172195 A1 | 9/2003 | Jonkers | |
| 2003/0182328 A1 | 9/2003 | Paquette | |
| 2003/0225760 A1 | 12/2003 | Ruuth | |
| 2004/0083225 A1 | 4/2004 | Gondi | |
| 2004/0098425 A1 | 5/2004 | Wiss | |
| 2004/0148289 A1 | 7/2004 | Bamford | |
| 2004/0158549 A1 | 8/2004 | Matena | |
| 2004/0205414 A1 | 10/2004 | Roselli | |
| 2005/0080801 A1 | 4/2005 | Kothandaraman | |
| 2005/0138081 A1* | 6/2005 | Alshab et al. | 707/200 |
| 2005/0149609 A1 | 7/2005 | Lamport | |
| 2005/0198106 A1 | 9/2005 | Lamport | |
| 2005/0240633 A1* | 10/2005 | Krishnaswamy et al. | 707/200 |
| 2005/0262097 A1 | 11/2005 | Sim-Tang | |
| 2005/0283373 A1 | 12/2005 | Lamport | |
| 2005/0283644 A1 | 12/2005 | Lorch | |
| 2005/0283659 A1 | 12/2005 | Lamport | |
| 2006/0036896 A1 | 2/2006 | Gamache | |
| 2006/0090095 A1 | 4/2006 | Massa | |
| 2006/0129575 A1* | 6/2006 | Lee et al. | 707/100 |
| 2006/0136781 A1 | 6/2006 | Lamport | |
| 2006/0168011 A1 | 7/2006 | Lamport | |
| 2006/0173693 A1* | 8/2006 | Arazi et al. | 705/1 |
| 2007/0027937 A1 | 2/2007 | McGrattan et al. | |
| 2007/0100739 A1* | 5/2007 | Cui et al. | 705/37 |
| 2007/0130226 A1* | 6/2007 | Banerjee et al. | 707/204 |
| 2007/0143299 A1 | 6/2007 | Huras | |
| 2007/0260644 A1 | 11/2007 | Ljungqvist | |
| 2008/0034251 A1 | 2/2008 | Singhal | |
| 2008/0098045 A1* | 4/2008 | Radhakrishnan et al. | 707/203 |
| 2008/0120298 A1 | 5/2008 | Duffy | |
| 2008/0120299 A1 | 5/2008 | Duffy | |
| 2008/0209145 A1 | 8/2008 | Ranganathan | |
| 2008/0222159 A1 | 9/2008 | Aranha | |
| 2008/0235245 A1 | 9/2008 | Huras | |
| 2009/0064160 A1 | 3/2009 | Larson | |
| 2009/0070330 A1 | 3/2009 | Hwang | |
| 2009/0119351 A1 | 5/2009 | Edlund | |
| 2009/0144220 A1 | 6/2009 | Feng | |
| 2009/0172142 A1 | 7/2009 | Hanai | |
| 2009/0222498 A1 | 9/2009 | Lu et al. | |
| 2009/0313311 A1 | 12/2009 | Hoffmann | |
| 2010/0005124 A1* | 1/2010 | Wagner | 707/202 |
| 2010/0011035 A1* | 1/2010 | Adkins et al. | 707/204 |
| 2010/0017495 A1 | 1/2010 | Lamport | |
| 2010/0106753 A1 | 4/2010 | Prabhakaran | |
| 2010/0281005 A1 | 11/2010 | Carlin | |
| 2011/0178984 A1 | 7/2011 | Talius | |

OTHER PUBLICATIONS

"Application Plugin Module (APM)", Netvault, BakBone Software, retrieved at <<http://webmail.quesse.it/it/backup/download/OFM_Plugin_Module.pdf>>, 2001.

U.S. Appl. No. 12/688,921, Non-Final Rejection dated Oct. 12, 2011, 9 pages.

U.S. Appl. No. 12/688,921, Amendment dated Jan. 7, 2012, 12 pages.

U.S. Appl. No. 12/688,921, Final Rejection dated Apr. 24, 2012, 11 pages.

U.S. Appl. No. 12/688,921, Amendment dated Jul. 24, 2012, 12 pages.

U.S. Appl. No. 12/688,921, Non-Final Rejection dated Aug. 17, 2012, 12 pages.

U.S. Appl. No. 12/688,921, Amendment dated Nov. 12, 2012, 13 pages.

U.S. Appl. No. 12/688,921, Final Rejection dated Feb. 11, 2013, 15 pages.

U.S. Appl. No. 12/688,921, Amendment dated May 8, 2013, 14 pages.

"Oracle Database High Availability Features and Products", Oracle Database High Availability Overview, 11g Release 1 (11.1), Chapter 2, Dec. 2009, retrieved at <<http://download.oracle.com/docs/cd/B28359_01/server.111/b28281/hafeatures.htm#HAOVW144>>, 66 pages.

"MySQL Cluster Features", Retrieved at <<http://www.mysql.com/products/database/cluster/features.html>> on Dec. 16, 2009, 4 pages.

* cited by examiner

| PARTITION KEY | TX START DBTS | OP DBTS | UTC | PRIMARY KEY | VALUE | TABLE NAME |
|---|---|---|---|---|---|---|
| | | | | | | |
| | | | | | | |
| | | | | | | |

LOGICAL DATA BACKUP AND ROLLBACK USING INCREMENTAL CAPTURE IN A DISTRIBUTED DATABASE

BACKGROUND

In a large distributed database system, traditional SQL (structured query language) backup and restore can be used for data protection. However, there are drawbacks. An on-disk copy of the backup of the full database is needed, which requires as much storage as the database being backed up. In addition, periodic backup of the transaction log is required for lower recovery point objective (RPO). Moreover, the recovery time objective (RTO) is poor because any restore operation, regardless of the data size involved, will need to have the full backup restored followed by applying a sequence of transaction log backup files. The process can be very time-consuming and labor-intensive, and the backup is stored in a binary format that is not directly queriable.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture is a cost-competitive approach that eliminates the need for on-disk full backups of data. Storage is optimized by retaining only those changes that have occurred, in a separate table. Thus, the architecture provides for incremental recovery of incremental changes in a relational database (e.g., SQL). The architecture provides improved recovery time and recovery point objectives. By using the incremental capture of changed data (e.g., in an XML format), the capability is provided to capture schema changes, query the incrementally captured data and efficiently restore user data to an earlier point-in-time state and with no downtime.

Changes (e.g., insert, update and delete operations) are tracked (e.g., continuously) by a set of triggers and the incrementally captured changed rows are inserted in a data capture table (a differential change "delta" table) according to a format (e.g., XML). The format is self-describing and contains the schema for the row inside the format.

Data rollback decompacts the incremental changes of the appropriate rows from the data capture table to an earlier point in time, and then overwrites the rows to production data. Insert operations are optimized to not create rows in the data capture table, but to maintain change tracking information (e.g. coordinate universal time (UTC) of insertion) in the base tables.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 5 illustrates an exemplary capture and change tracking table.

DETAILED DESCRIPTION

Figure 1:
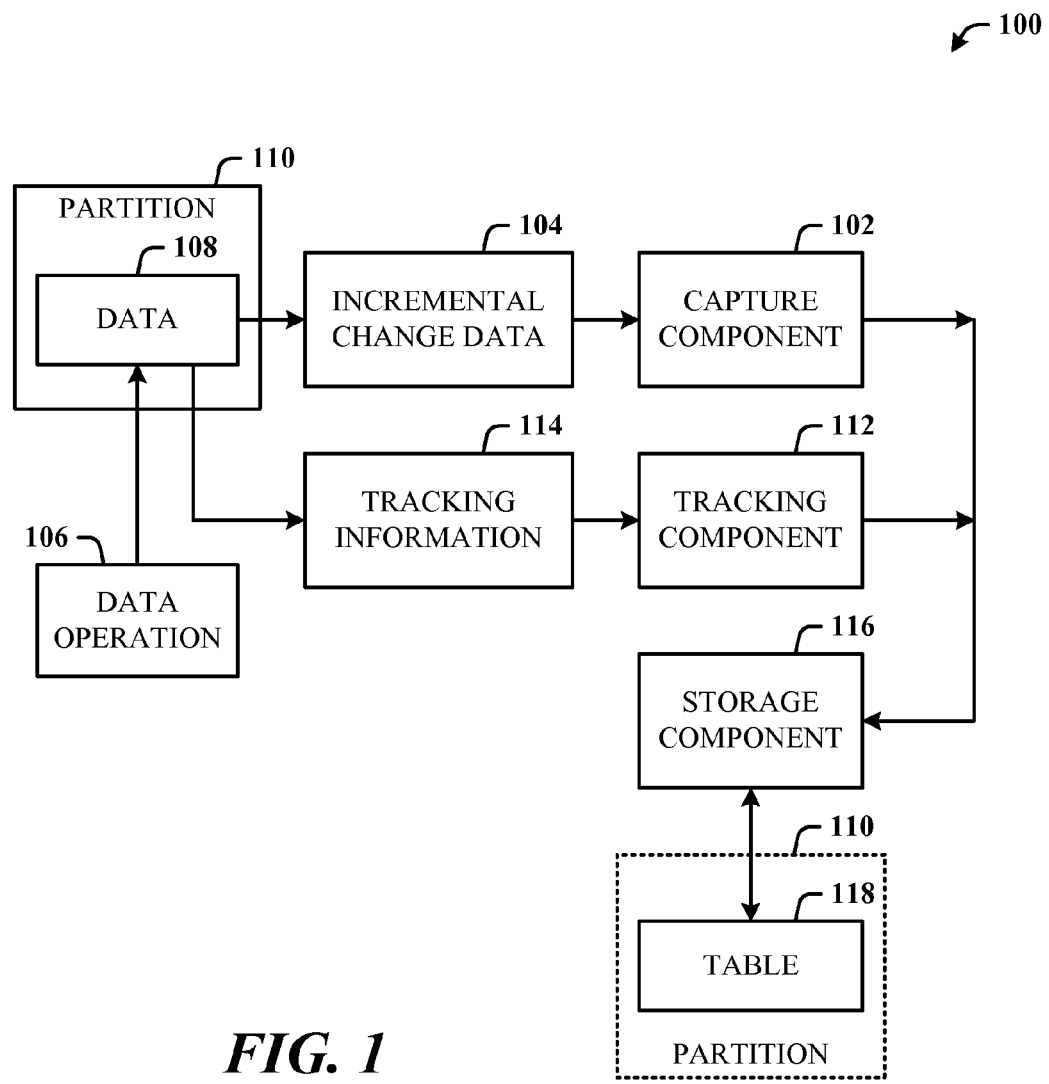
FIG. 1 illustrates a computer-implemented data management system in accordance with the disclosed architecture.

The disclosed architecture provides the capability to efficiently capture "before-image" (incremental) data changes and change tracking information of data operations, and then to use the changes and information to efficiently rollback update/delete/insert operations. The before-image data is data to which changes have been made, but before that changed data has been processed to overwrite the production data. The storage space for the incremental data is a small fraction of the space utilized for full and transaction log backups. Moreover, the time to rollback update/delete/insert operations from a data capture table is small relative to the time to restore from full and transaction log backups.

As used herein, a table is a logical relation that employs a partitioning key that controls partitioning across servers, and also employs a clustering key that controls the ordering of rows within a server. A table group is a set of tables with the same partitioning key. A row group is a set of rows in a table group having the same partitioning key value. The row group is on exactly one server, but may not be clustered. Each table group can be distributed across nodes. Each storage node is assigned ranges (partitions) of key values, and each partition is replicated for durability.

The before-image data can be persisted in a XML (extensible markup language) format that contains the self-describing schema of the rows. Hence, the solution works for schema evolution. Additionally, the before-image data can be persisted in the same partition (e.g. table group), and thus, is highly available. Moreover, the before-image retention policy is managed and maintained automatically and the before-image data can be queried via traditional relational languages such as TSQL (transact structured query language (SQL)).

The before-image is chosen rather than the after-image so that the changes can be applied backwards from the current data inside the partition (Undo instead of Redo), and thus, eliminates the need for a full partition backup to save storage space.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented data management system 100 in accordance with the disclosed architecture. The system 100 includes a capture component 102 that captures incremental change data 104 associated with a data operation 106 on data 108 in a partition 110 of a distributed database. The system 100 can also include a tracking component 112 that creates tracking information 114 associated with the data operation 106 of the incremental change data 104, and a storage component 116 that stores the incremental change data 104 and associated tracking information 114 in a table 118 of the partition 108. The incremental change data 104 is highly available for access as desired. The capture component 102 and tracking component 112 pass data and information to the storage component 116.

The incremental change data 104 and the tracking information 114 are stored in the table 118 in a human-readable format (e.g., XML-extensible markup language) that includes a self-describing schema of rows in the table 118. The incremental change data 104 and the tracking information 114 are stored in the table 118 in the same transaction as the data 108 is committed to the database. The incremental change data 104 is persisted in a same partition (partition 110) in which the data 108 resides. The incremental change data 104 is highly available and searchable according to a query language. The table 118 includes a history of changes of incremental change data 104. The changes are associated with at least one of time a data operation occurred, time a transaction occurred, or time of row creation.

Figure 2:
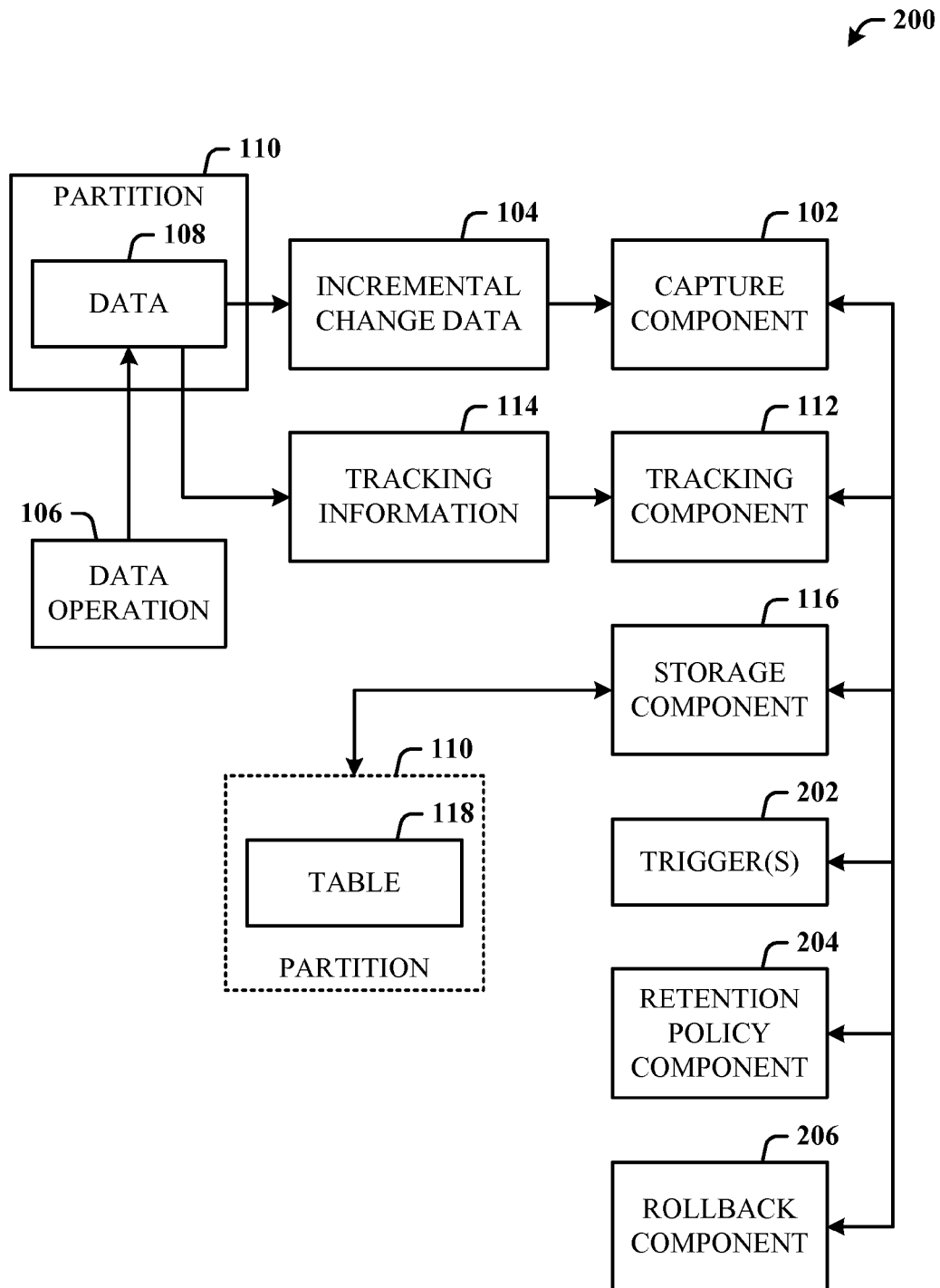
FIG. 2 illustrates an alternative embodiment of a data management system.

FIG. 2 illustrates an alternative embodiment of a data management system 200. The system 200 includes the capture component 102 that captures the incremental change data 104 associated with the data operation 106 on the data 108 in the partition 110 of the distributed database, the tracking component 112 that creates the tracking information 114 associated with the data operation 106, the storage component 116 that stores the incremental change data 104 and associated tracking information 114 in the table 118. Here, the communications between the components (102, 112, 116, 204, and 206) and the trigger(s) 202 is represented by bi-directional arrows, since there can be communications between such entities in both directions. The system 200 can also include a trigger (of one or more triggers 202) that automatically initiates the capture, tracking, and storage of the incremental change data 104 and the tracking information 114 in the table 118.

The incremental change data 104 and the tracking information 114 are stored in the table 118 in a human-readable format that includes a self-describing schema of rows from the base table 108. The incremental change data 104 and the tracking information 114 are stored in the table 118 in the same transaction as the 108 data is committed to the database. The incremental change data 104 is persisted in the partition 110 in which the data 108 resides, is highly available, and is searchable using a query language. The table 118 includes a history of changes of incremental change data. The changes are associated with the time a data operation occurred (a data operation timestamp), the time a transaction occurred (a transaction timestamp), and the time of row creation (a coordinated universal time-UTC).

The system 200 can further comprise a retention policy component 204 that facilitates the creation and application of retention policies to the incremental change data 104 and associated tracking information 114 and, a rollback component 206 for restoring state of the data 108 to a previous point in time.

Figure 3:
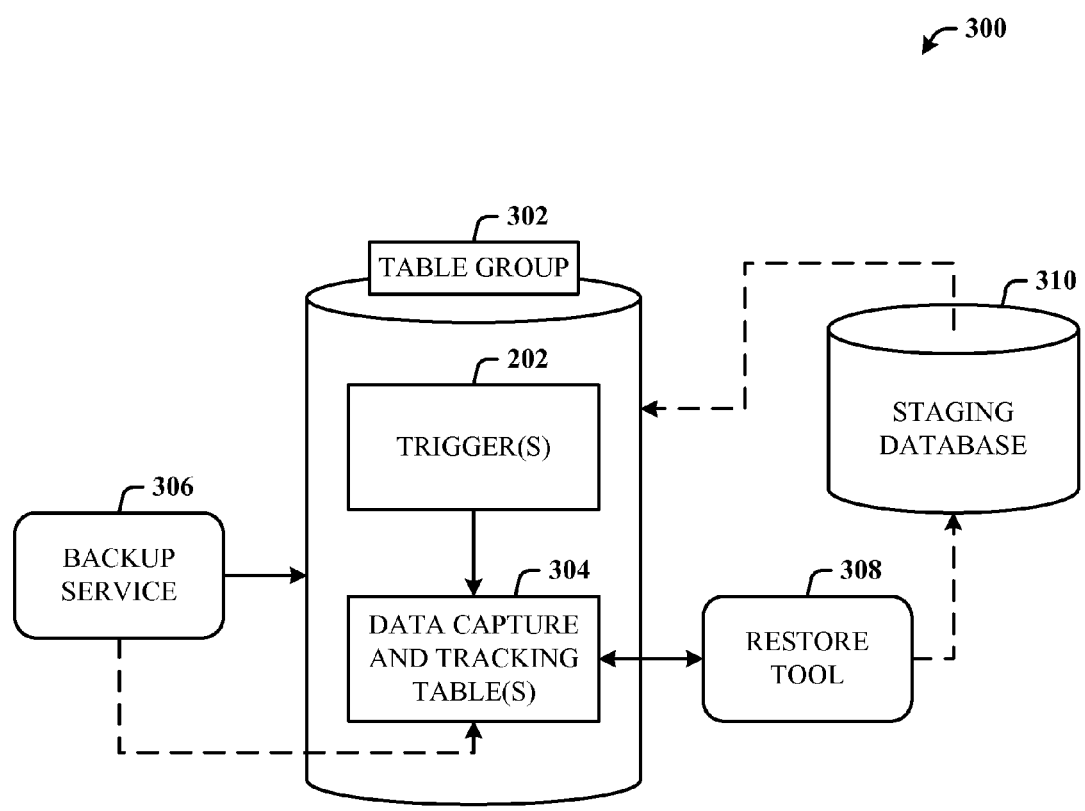
FIG. 3 illustrates an alternative representation of a data management system.

FIG. 3 illustrates an alternative representation of a data management system 300. The system 300 (and systems 100 and 200, for example) can be used in cloud computing environments for backup and restore functions. For each partition (of multiple replicas that include a primary replica and multiple secondary replicas) in a table group 302 in the database, a change capture and tracking table 304 (e.g., the table 118 of FIG. 1) is created. This table 304 (also referred to as an incremental change table or "delta" table) stores row values from the original table group 302 when certain changes are made to the original table group 302.

The system 300 can be considered as two distinct applications interfacing with the table group 302. A backup service 306 installs the data capture and tracking table(s), the triggers 202 (e.g., SQL Update and Delete triggers), and adds three tracking columns to the base tables. These additional columns are utilized to track Insert operations. These components backup the data for the table group. A restore tool 308 allows a user to restore a previous state of table group 302 to staging database 310.

To perform the backup function, triggers 202 are installed for the Delete and Update operations on every table in each table group. The triggers 202 capture the changes made on the base row and insert a record into the data capture and tracking table 304. These values can then be inserted back, or restored, into the original database or staging database from the data capture and tracking table 304. When restoring, the record closest in time to the requested restore time is obtained and the change is applied back to the base row. In this way, actions made upon the database can be undone, within a set time frame, by the owners of the database.

The trigger captures the change made to the base row and inserts the before-image (incremental change data) into a data capture and tracking table 304 maintained by the system. The table 304 serves as the history of changes that is used to rollback (restore) operations. The data capture and tracking table 304 is persisted in the same table group as user data, so the table 304 is highly available with multiple copies. Moreover, since the before-image is in an XML format, it is easily queriable.

Figure 4:
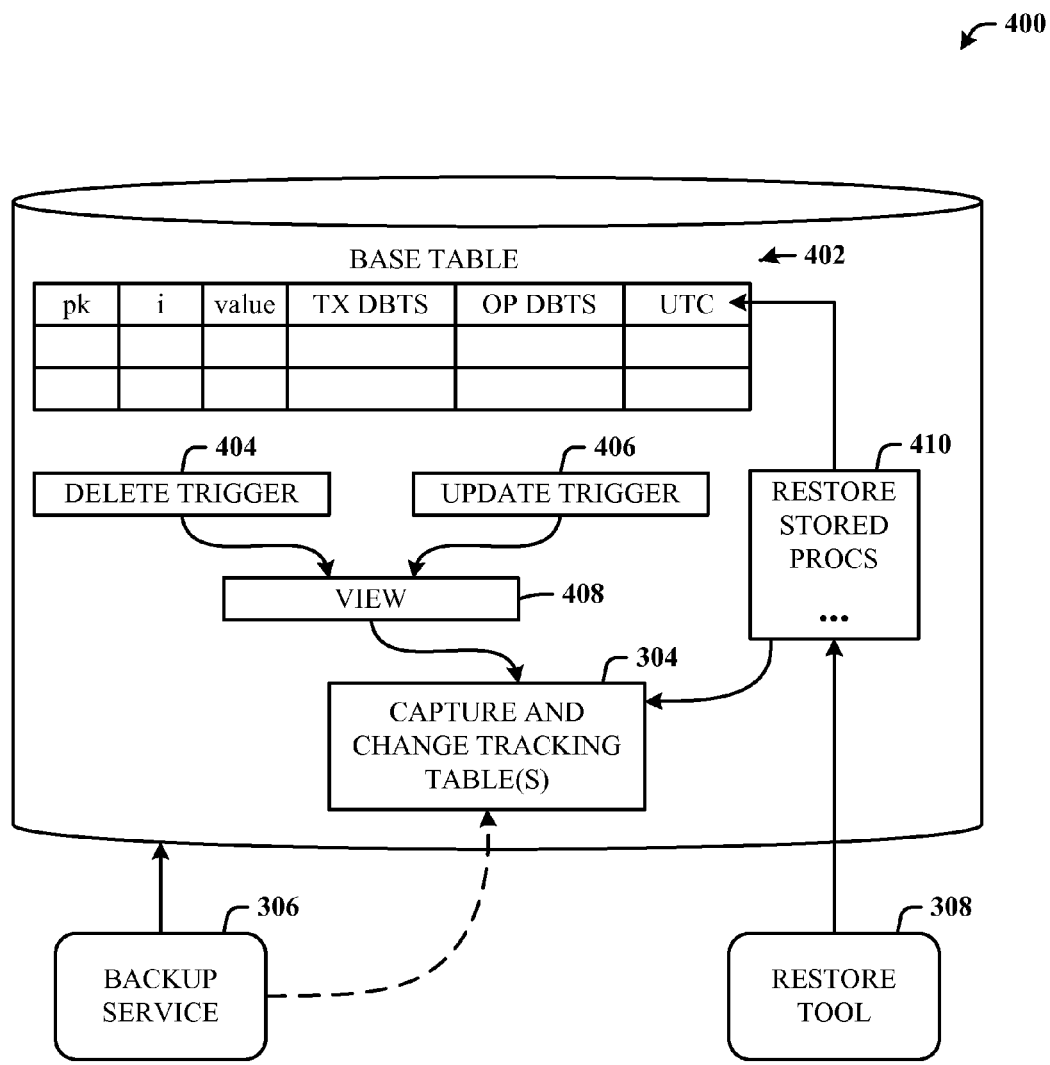
FIG. 4 illustrates a system showing modifications made to a base table for Update and Delete data operations.

FIG. 4 illustrates a system 400 showing modifications made to a base table 402 for Update and Delete data operations. There are three columns which are used to track Insert, Delete, and Update operations. These columns include a UTC timestamp and two DBTS (Database Time Stamp) columns (TX DBTS and OP DBTS). The TX DBTS column tracks the larger transactional context of the Insert, Delete and Update operations, and the OP DBTS column tracks the operation of a single Insert, Delete and Update.

The capture and change tracking table 304 is where data from the base table is stored before changes become permanent (overwritten on the production data). There is one active capture and change tracking table 304 per partition per table group. The columns consist of XML versions of the base table data, and the UTC and DBTS tracking columns to aid in restore operations, and other metadata related to both backup and restore. When Update and Delete operations are performed on the base table, the corresponding triggers (Delete trigger 404 and Update trigger 406) fire and copy the old data into the capture and change tracking table 304.

There is a view 408 on the capture and change tracking table 304. The triggers (404 and 406) refer to this view 408 as an indirection to the most recent (active) capture and change tracking table. The capture and change tracking table 304 cannot be referenced directly because its actual name changes during cleanup of old capture and change tracking tables.

An information table can be provided that stores schema versions of the base tables. This is useful for tracking schema changes that span a restore operation. The backup service 306 installs all above components, and also cleans the old (expired) capture and change tracking tables.

Restore stored procedures (procs) 410 restore the partition to a previous state based on a given UTC time. The procedures 410 are installed along with the other components. One proc restores a row group and the other proc restores a whole partition.

When a restore operation is performed, the three columns are utilized to track the order of previous Insert, Delete, and Update operations. These columns have default values that are filled in upon each Insert, Delete, and Update operation. The default value for each column calls a function (an intrinsic) that fills in the correct values automatically during the Insert, Delete, or Update operation.

The TX DBTS allows entries in the base table and the capture and change tracking table 304 to be sorted and grouped by transactions. This uses an intrinsic that returns the DBTS of the individual operation's current transaction. On the server, this intrinsic stores the current DBTS for the entire transaction and then increments the DBTS. Any operation in a given transaction will have the same DBTS value when this intrinsic is called. Any other DBTS reference will return the incremented, current non-transactional DBTS value.

The OP DBTS exposes the order of each operation, and uses an intrinsic that returns the current DBTS and increments the DBTS. This is different for every entry in the base table because each Insert operation calls the intrinsic via the default value for the column.

The UTC timestamp is the current UTC time of the Insert operation that created the row. This timestamp used to aid in restore operations. Users can choose a UTC date or time to which the restore is desired. Restore determines the actual restore point based on the DBTS values using the UTC timestamp as a guide. This is utilized to restore the database to a consistent transactional state.

The Insert operation is tracked in the base table using columns that are added to the base table by the system. These columns store a sequence number for the operation, the UTC time of the operation as measured at the primary replica of the partition, and a transaction identifier. (These three fields are also added to the data capture table.) No rows are inserted into the data capture table for Insert operations. This optimization reduces the storage requirements at the cost of a slight increase in complexity of the rollback logic.

During rollback, the last committed state of a row (which has been saved in the data capture table) before the requested rollback time is used to overwrite the base row.

There is no trigger for an Insert operation. When an insertion is made into a backed up base table, no information is stored in the capture and change tracking table. The default values for the three additional columns are filled in automatically. This new data allows the restore operation to account for, and order, Insert operations.

To back up the data during an Update or Delete operation, triggers are installed by the backup service 306 for the relevant base tables. On an Update or Delete operation to the base table, the triggers store an XML representation of the pre-Update or pre-Delete base table row (without the three tracking columns). This captures the data for backup, and also the "schema" of the database. Secondly, it stores the partition key. Insert trigger-based DBTS entries do not alter the base table. Without the backup service 306 running, the triggers continue to store changed data into the capture and change tracking table 304.

The view 408 on the capture and change tracking table 304 is used so that when new capture and change tracking tables are made for a given partition within a row group, and the name of the table itself changes, the triggers do not have to change.

Both the Update and Delete triggers insert the necessary backup data into an installed view. Whenever creating a new capture and change tracking table, with a new name based on its expiration date, the view is recreated to point to the new table.

The backup service 306, on initialization, reads information from configuration files, which files contain information on each database that is going to be backed up by the capture and change tracking table. The service 306 then sets up the capture and change tracking tables and triggers for the table groups. The service 306 then schedules two operations: a check for base table schema changes and upgrades, and, the cleanup of the capture and change tracking tables.

To restore a partition (e.g., table group) or a row group to a particular point in time, the restore tool 308 calls one or more stored procedures 410 that install during backup service initialization or after a schema change. One procedure restores every table in the entire partition. Another procedure restores a row group within that partition. The procedures take an argument for the desired point-in-time to restore.

With respect to achieving transactional consistency, during a restore (rollback) operation, there is the potential to create an inconsistent state if the desired restore point falls in the middle of a stored (backed up) transaction. For each stored change to the database, the transaction start DBTS and operation DBTS are stored for each operation in a transaction.

An intrinsic TX_START_DBTS( ) is exposed that returns the DBTS of the first operation in the current transaction. If no operation had been performed by this transaction before this intrinsic is called, @@DBTS is incremented and the value recorded in the transaction record.

With respect to transaction start times, observe that rolling back some of a given transaction operation, while leaving other operations of the same transaction behind, may be undesirable. Consider a system in which there are many transactions running at any given time, and each of those transactions modifies more than one row. Every value of DBTS may be in the middle of some transaction. Thus, for no value of DBTS will roll back of all operations later than this value be a correct answer. Thus, using DBTS of the operation as the sole criteria is limited.

The ability is provided to roll back operations that belong to transactions that have already started rolling back. In support thereof, a transaction identifier is stored with the records. Furthermore, the transaction identifier is unique across failovers. A DBTS has this property and is guaranteed to move forward in failovers. Hence, the transaction start DBTS is a candidate for this need.

Consider the following timeline for transactions T1, T2, and T3.

| Time | Operation |
| --- | --- |
| 5 | 5: X = 0 |
| 10 | T1 starts (does something) |
| 15 | T2 starts (does something) |
| 20 | T2 updates X to 2 |
| 25 | T2 commits |
| 30 | T1 updates X to 1 |
| 35 | T1 commits |
| 40 | T3 starts |

| Time | Operation |
| --- | --- |
| 41 | T3 updates X to 3 |
| 42 | T3 commits |

Now, restore to DBTS=28. Since transaction T2 has committed by then, and transaction T1 has not, X is restored to 2. However, to accomplish this, note that the transaction T1 update occurs after the transaction T2 update, and yet the transaction T1 start-time is earlier than the transaction T2 start-time. Thus, more than the transaction start time is needed to solve this problem.

Columns are employed in the main table and in the capture and change tracking table in order to optimize for an insert-heavy workload. The disclosed architecture does not involve writing a second row on inserts (or even having a trigger execute).

With respect to configuring backup policy, a key customer visible policy parameter is specified in a policy file.

A retention period determines how long the data is available for recovery. This basically governs the duration for which tracking data will be kept in the data capture and tracking table. Old data in the data capture table can be lazily deleted by the system.

The rollback procedure is executed as a rollback command that takes as parameters the row group to be rolled back and the UTC time to roll the row group back to. (A row group is a set of rows which have the same [partition] key values.) The command is capable of overwriting production data to the state that existed at the specified rollback time. A variation of the command can roll back multiple row groups to a point in time. The command can be extended in various other ways, as well.

FIG. 5 illustrates an exemplary capture and change tracking table 500. The table 500 (similar to tables 118 and 304) stores a partition key and type for the base table, transaction start DBTS (TX START DBTS), operation DBTS (OP DBTS), a UTC-based timestamp (used for finding the restore points), the primary key(s) of the row in the base table (as XML), the "old" value from the base table row (an XML version of the data in the database before the Delete or Update operation), and the name of the base table from which the value and primary key columns were saved. In terms of cleanup, the name of the capture and change tracking table 500 can be the expiration date. The creation date and expiration date of the capture and change tracking table 500 can be appended to the name of the table, which eliminates the need for an extra field.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
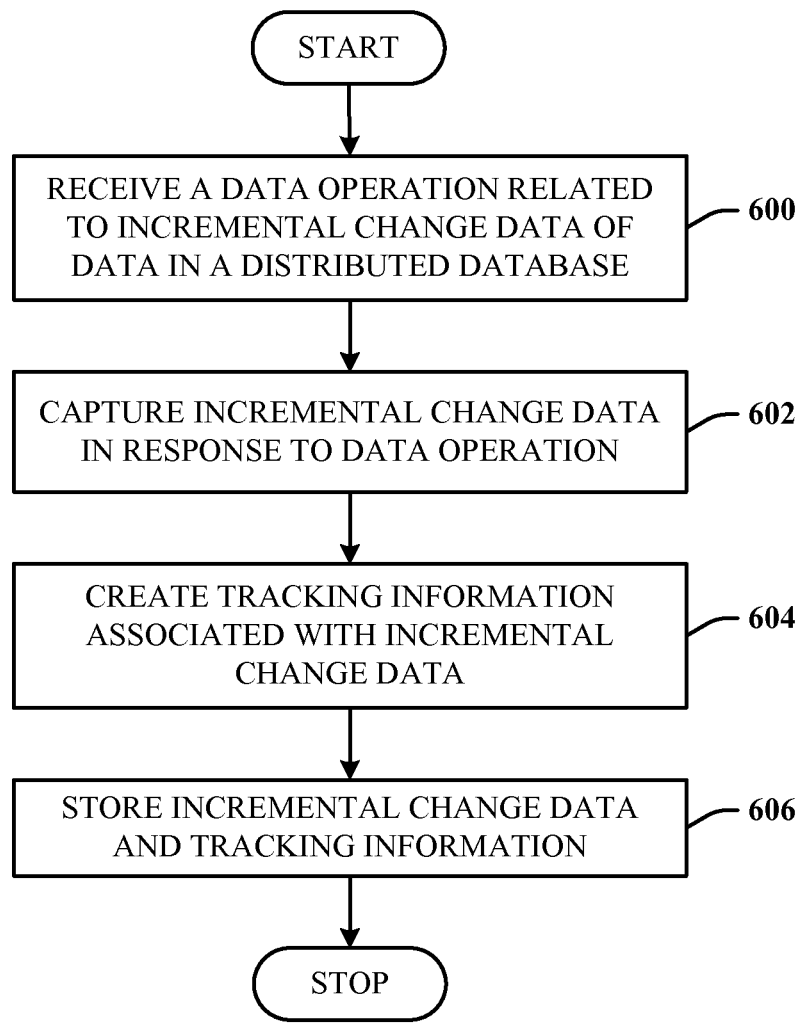
FIG. 6 illustrates a computer implemented data management method in accordance with the disclosed architecture.

FIG. 6 illustrates a computer implemented data management method in accordance with the disclosed architecture.

At 600, a data operation related to incremental change data of data in a distributed database is received. At 602, the incremental change data is captured in response to the data operation. At 604, tracking information associated with the incremental change data is created. At 606, the incremental change data and tracking information is stored.

Figure 7:
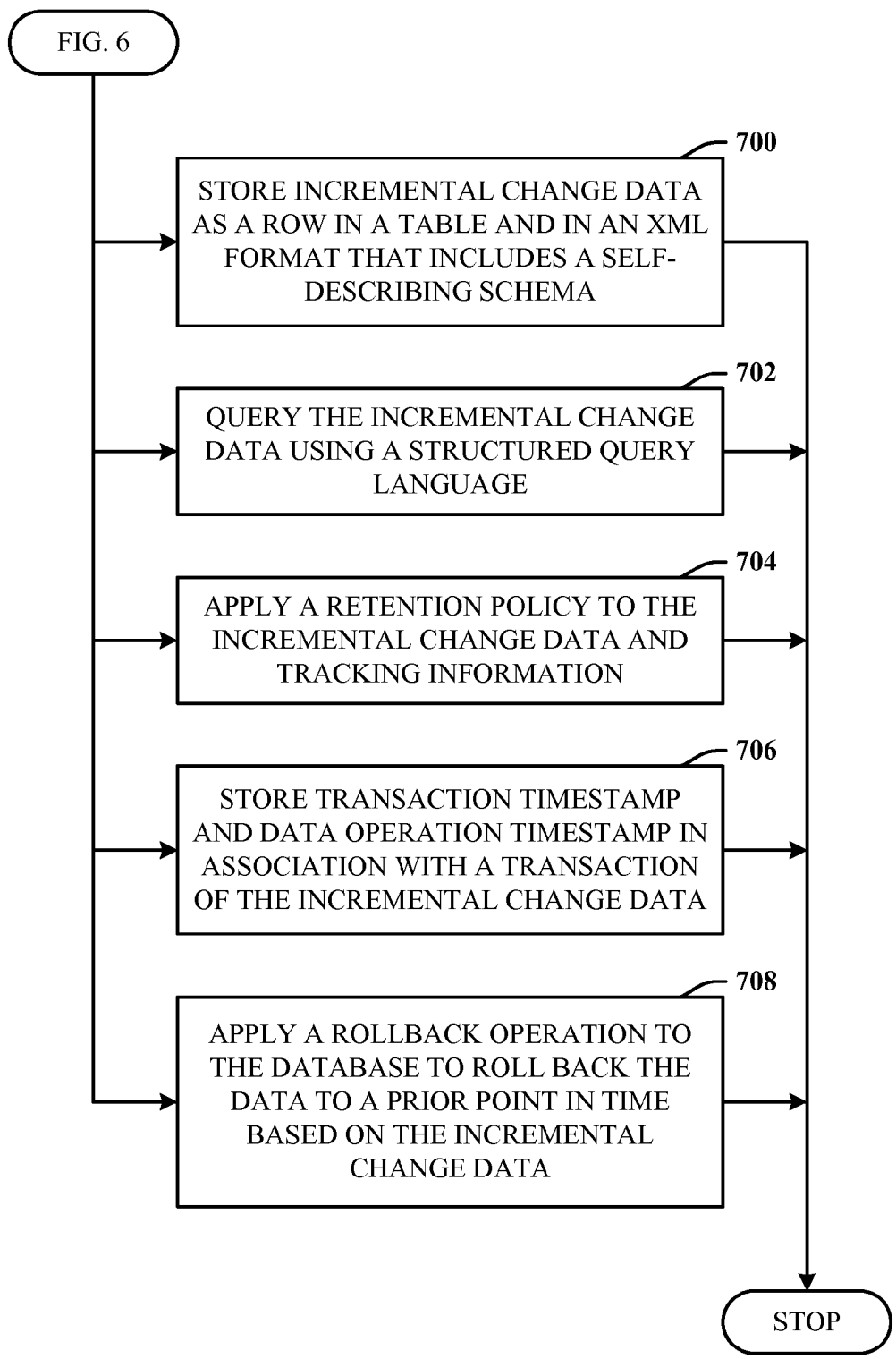
FIG. 7 illustrates additional aspects of the method of FIG. 6.

FIG. 7 illustrates additional aspects of the method of FIG. 6. At 700, the incremental change data is stored as a row in a table and in an XML format that includes a self-describing schema. At 702, the incremental change data is queried using a structured query language. At 704, a retention policy is applied to the incremental change data and tracking information. At 706, a transaction timestamp and data operation timestamp are stored in association with a transaction of the incremental change data. At 708, a rollback operation is applied to the database to roll back the data to a prior point in time based on the incremental change data.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 8:
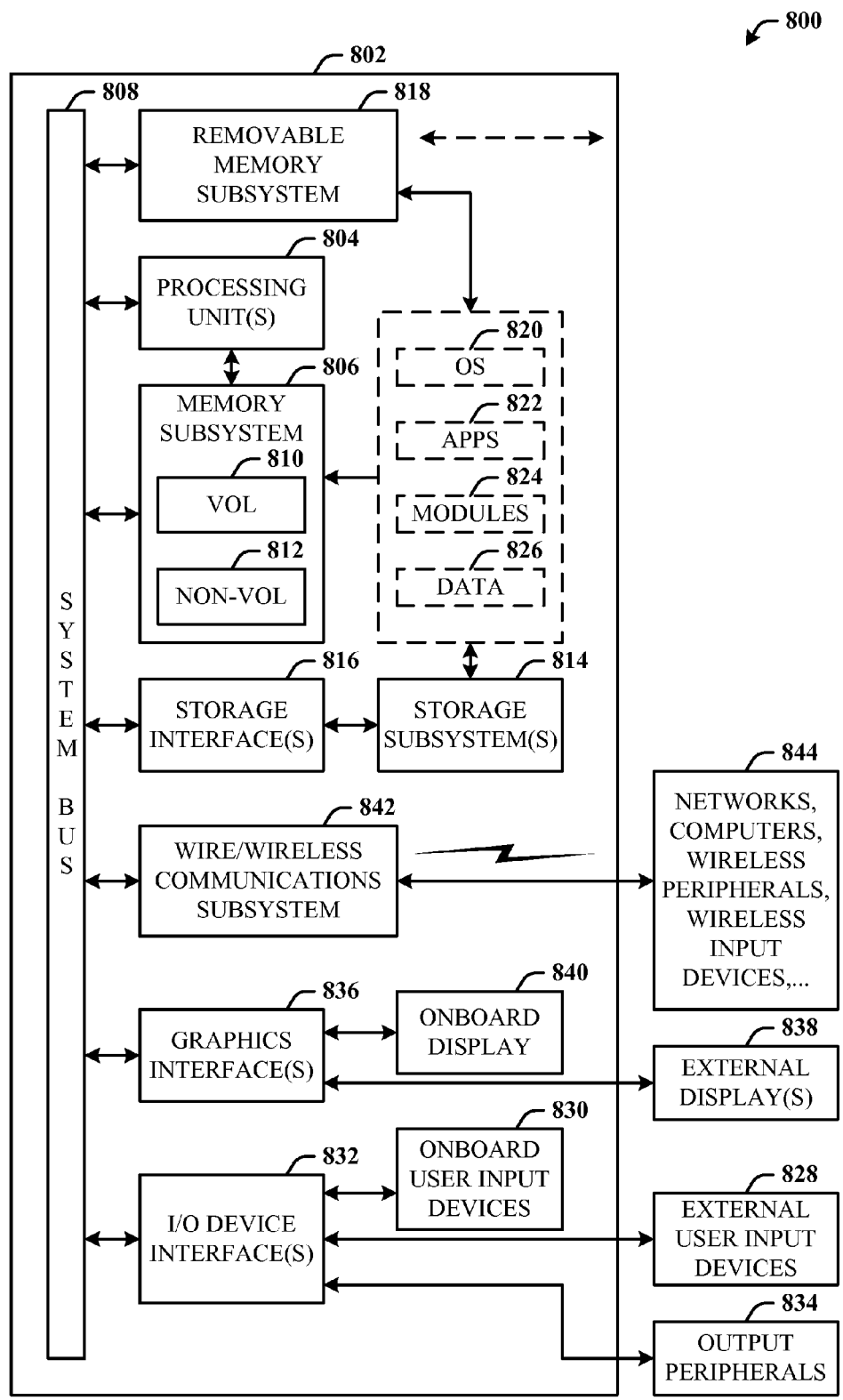
FIG. 8 illustrates a block diagram of a computing system operable to execute logical data backup and rollback using before-image capture in accordance with the disclosed architecture.

Referring now to FIG. 8, there is illustrated a block diagram of a computing system 800 operable to execute logical data backup and rollback using before-image capture in accordance with the disclosed architecture. In order to provide additional context for various aspects thereof, FIG. 8 and the following description are intended to provide a brief, general description of the suitable computing system 800 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 800 for implementing various aspects includes the computer 802 having processing unit(s) 804, a computer-readable storage such as a system memory 806, and a system bus 808. The processing unit(s) 804 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 806 can include computer-readable storage such as a volatile (VOL) memory 810 (e.g., random access memory (RAM)) and non-volatile memory (NON-VOL) 812 (e.g., ROM, EPROM, EEPROM, etc.). A basic input/output system (BIOS) can be stored in the non-volatile memory 812, and includes the basic routines that facilitate the communication of data and signals between components within the computer 802, such as during startup. The volatile memory 810 can also include a high-speed RAM such as static RAM for caching data.

The system bus 808 provides an interface for system components including, but not limited to, the system memory 806 to the processing unit(s) 804. The system bus 808 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 802 further includes machine readable storage subsystem(s) 814 and storage interface(s) 816 for interfacing the storage subsystem(s) 814 to the system bus 808 and other desired computer components. The storage subsystem(s) 814 can include one or more of a hard disk drive (HDD), a magnetic floppy disk drive (FDD), and/or optical disk storage drive (e.g., a CD-ROM drive DVD drive), for example. The storage interface(s) 816 can include interface technologies such as EIDE, ATA, SATA, and IEEE 1394, for example.

One or more programs and data can be stored in the memory subsystem 806, a machine readable and removable memory subsystem 818 (e.g., flash drive form factor technology), and/or the storage subsystem(s) 814 (e.g., optical, magnetic, solid state), including an operating system 820, one or more application programs 822, other program modules 824, and program data 826.

The one or more application programs 822, other program modules 824, and program data 826 can include the entities and components of the system 100 of FIG. 1, the entities and components of the system 200 of FIG. 2, the entities and components of the system 300 of FIG. 3, the entities and components of the system 400 of FIG. 4, the table 500, and the methods represented by the flow charts of FIGS. 6-7, for example.

Generally, programs include routines, methods, data structures, other software components, etc., that perform particular tasks or implement particular abstract data types. All or portions of the operating system 820, applications 822, modules 824, and/or data 826 can also be cached in memory such as the volatile memory 810, for example. It is to be appreciated that the disclosed architecture can be implemented with various commercially available operating systems or combinations of operating systems (e.g., as virtual machines).

The storage subsystem(s) 814 and memory subsystems (806 and 818) serve as computer readable media for volatile and non-volatile storage of data, data structures, computer-executable instructions, and so forth. Computer readable media can be any available media that can be accessed by the computer 802 and includes volatile and non-volatile internal and/or external media that is removable or non-removable. For the computer 802, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 802, programs, and data using external user input devices 828 such as a keyboard and a mouse. Other external user input devices 828 can include a microphone, an IR (infrared) remote control, a joystick, a game pad, camera recognition systems, a stylus pen, touch screen, gesture systems (e.g., eye movement, head movement, etc.), and/or the like. The user can interact with the computer 802, programs, and data using onboard user input devices 830 such as a touchpad, microphone, keyboard, etc., where the computer 802 is a portable computer, for example. These and other input devices are connected to the processing unit(s) 804 through input/output (I/O) device interface(s) 832 via the system bus 808, but can be connected by other interfaces such as a parallel port, IEEE 1394 serial port, a game port, a USB port, an IR interface, etc. The I/O device interface(s) 832 also facilitate the use of output peripherals 834 such as printers, audio devices, camera devices, and so on, such as a sound card and/or onboard audio processing capability.

One or more graphics interface(s) 836 (also commonly referred to as a graphics processing unit (GPU)) provide graphics and video signals between the computer 802 and external display(s) 838 (e.g., LCD, plasma) and/or onboard displays 840 (e.g., for portable computer). The graphics interface(s) 836 can also be manufactured as part of the computer system board.

The computer 802 can operate in a networked environment (e.g., IP-based) using logical connections via a wired/wireless communications subsystem 842 to one or more networks and/or other computers. The other computers can include workstations, servers, routers, personal computers, microprocessor-based entertainment appliances, peer devices or other common network nodes, and typically include many or all of the elements described relative to the computer 802. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 802 connects to the network via a wired/wireless communication subsystem 842 (e.g., a network interface adapter, onboard transceiver subsystem, etc.) to communicate with wired/wireless networks, wired/wireless printers, wired/wireless input devices 844, and so on. The computer 802 can include a modem or other means for establishing communications over the network. In a networked environment, programs and data relative to the computer 802 can be stored in the remote memory/storage device, as is associated with a distributed system. It will be appreciated that the network connections shown are exemplary and other means of establishing a communications link between the computers can be used.

The computer 802 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 9:
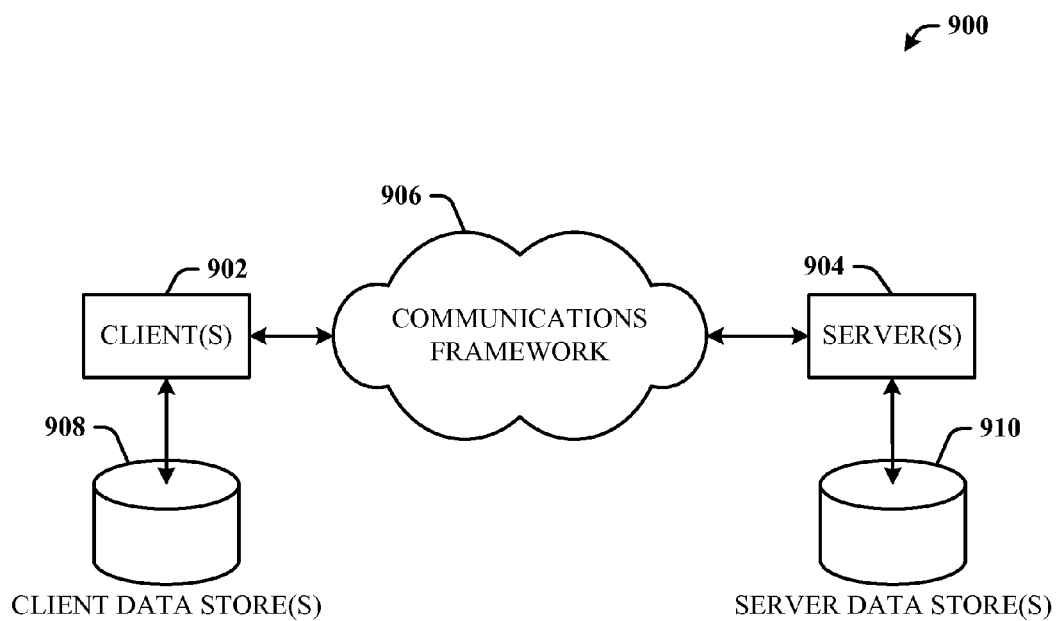
FIG. 9 illustrates a schematic block diagram of a computing environment that executes logical data backup and rollback using before-image capture.

Referring now to FIG. 9, there is illustrated a schematic block diagram of a computing environment 900 that executes logical data backup and rollback using before-image capture. The environment 900 includes one or more client(s) 902. The client(s) 902 can be hardware and/or software (e.g., threads, processes, computing devices). The client(s) 902 can house cookie(s) and/or associated contextual information, for example.

The environment 900 also includes one or more server(s) 904. The server(s) 904 can also be hardware and/or software (e.g., threads, processes, computing devices). The servers 904 can house threads to perform transformations by employing the architecture, for example. One possible communication between a client 902 and a server 904 can be in the form of a data packet adapted to be transmitted between two or more computer processes. The data packet may include a cookie and/or associated contextual information, for example. The environment 900 includes a communication framework 906 (e.g., a global communication network such as the Internet) that can be employed to facilitate communications between the client(s) 902 and the server(s) 904.

Communications can be facilitated via a wire (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented data management system having a physical media, comprising:
    one or more processors configured to provide:
    a capture component that captures incremental change data associated with a data operation on data in a partition of a distributed database;
    a tracking component that creates tracking information associated with the data operation of the incremental change data;
    a storage component that stores the incremental change data and associated tracking information in a table of the partition, the incremental change data being highly available, the table including a history of changes of incremental change data, the table including, for each row of the history, time a data operation associated with the row occurred, time a transaction associated with the row occurred, and time of row creation of a base row associated with the row, wherein the incremental change data and the tracking information are stored in the table in a format that includes a self-describing schema of data changes in the table, the incremental change data and the tracking information are stored in the table in the same transaction as data change is committed to the database; and
    a rollback component for restoring a first base row to a previous state associated with a first point in time, the rollback component configured to retrieve from the table a first incremental change data value, the first incremental change data value including the previous state, and restoring the first base row to the previous state without first restoring the first base row to a second previous state, the second previous state being associated with a second point in time, the second point in time being subsequent to the first point in time.

2. The system of claim 1, further comprising one or more triggers that automatically initiate capture of the incremental change data, creation of the tracking information and, storage of both the incremental change data and the tracking information in the table.

3. The system of claim 1, wherein the incremental change data is persisted in a same partition in which the data resides.

4. The system of claim 1, further comprising a retention policy component that facilitates creation and application of retention policies to the incremental change data and associated tracking information.

5. The system of claim 1, further comprising a backup service that adds three tracking columns to a base table of data in the partition of the distributed database, the three tracking columns utilized to track insert operations.

6. A computer-implemented data management method that employs a processor and memory, comprising:
    capturing incremental change data associated with a data operation on data in a partition of a distributed database;
    creating tracking information associated with the data operation of the incremental change data;
    storing the incremental change data and associated tracking information in a table of the partition, the incremental change data being highly available, the table including a history of changes of incremental change data, the table including, for each row of the history, time a data operation associated with the row occurred, time a transaction associated with the row occurred, and time of row creation of a base row associated with the row, wherein the incremental change data and the tracking information are stored in the table in a format that includes a self-describing schema of data changes in the table, the incremental change data and the tracking information are stored in the table in the same transaction as data change is committed to the database; and
    restoring, by using a rollback component, a first base row to a previous state associated with a first point in time, the rollback component configured to retrieve from the table a first incremental change data value, the first incremental change data value including the previous state, and restoring the first base row to the previous state without first restoring the first base row to a second previous state, the second previous state being associated with a second point in time, the second point in time being subsequent to the first point in time.

7. The method of claim 6, further comprising receiving one or more triggers that automatically initiate capture of the incremental change data, creation of the tracking information and, storage of both the incremental change data and the tracking information in the table.

8. The method of claim 6, wherein the incremental change data is persisted in a same partition in which the data resides.

9. The method of claim 6, further comprising creating and applying of retention policies to the incremental change data and associated tracking information.

10. The method of claim 6, further comprising providing a backup service that adds three tracking columns to a base table of the data in the partition of the distributed database, the three tracking columns utilized to track insert operations.

11. A computer-readable memory having computer-executable instructions, which when executed perform actions, comprising:

capturing incremental change data associated with a data operation on data in a partition of a distributed database;

creating tracking information associated with the data operation of the incremental change data;

storing the incremental change data and associated tracking information in a table of the partition, the incremental change data being highly available, the table including a history of changes of incremental change data, the table including, for each row of the history, time a data operation associated with the row occurred, time a transaction associated with the row occurred, and time of row creation of a base row associated with the row, wherein the incremental change data and the tracking information are stored in the table in a format that includes a self-describing schema of data changes in the table, the incremental change data and the tracking information are stored in the table in the same transaction as data change is committed to the database; and restoring, by using a rollback component, a first base row to a previous state associated with a first point in time, the rollback component configured to retrieve from the table a first incremental change data value, the first incremental change data value including the previous state, and restoring the first base row to the previous state without first restoring the first base row to a second previous state, the second previous state being associated with a second point in time, the second point in time being subsequent to the first point in time.

12. The computer-readable memory of claim 11, further comprising computer-executable instructions, which when executed perform actions, comprising receiving one or more triggers that automatically initiate capture of the incremental change data, creation of the tracking information and, storage of both the incremental change data and the tracking information in the table.

13. The computer-readable memory of claim 11, wherein the incremental change data is persisted in a same partition in which the data resides.

14. The computer-readable memory of claim 11, further comprising computer- executable instructions, which when executed perform actions, comprising creating and applying of retention policies to the incremental change data and associated tracking information.

15. The computer-readable memory of claim 11, further comprising providing a backup service that adds three tracking columns to a base table of the data in the partition of the distributed database, the three tracking columns utilized to track insert operations.

* * * * *